United States Patent [19]

Swanson et al.

[11] Patent Number: 5,058,031
[45] Date of Patent: Oct. 15, 1991

[54] MULTILEVEL PHASE UNBALANCE COMPRESSOR MOTOR PROTECTION SYSTEM

[75] Inventors: Robert M. Swanson; Paul C. Rentmeester; David M. Foye, all of La Crosse, Wis.

[73] Assignee: American Standard Inc., New York, N.Y.

[21] Appl. No.: 502,355

[22] Filed: Mar. 30, 1990

[51] Int. Cl.$^5$ ...................... G01R 25/00; G06F 15/20
[52] U.S. Cl. ................................. 364/483; 364/481; 361/22; 361/23
[58] Field of Search ............... 318/563, 564, 565, 635, 318/650; 361/5, 22, 23, 24, 25, 27, 28, 31, 77, 85, 86, 90, 91, 92, 96; 62/161, 155; 364/483, 492, 184, 187, 481

[56] References Cited

U.S. PATENT DOCUMENTS

| | | | |
|---|---|---|---|
| 3,619,722 | 11/1971 | Gill et al. | 361/22 |
| 3,633,073 | 1/1972 | Day, III | 361/22 |
| 3,742,303 | 6/1973 | Dageford | 361/22 |
| 4,022,598 | 5/1977 | Gucwa, Jr. et al. | 62/164 |
| 4,034,570 | 7/1977 | Anderson et al. | 62/158 |
| 4,038,061 | 7/1977 | Anderson et al. | 62/126 |
| 4,132,085 | 1/1979 | Maio et al | 62/155 |
| 4,307,775 | 12/1981 | Saunders et al. | 165/11 |
| 4,319,298 | 3/1982 | Davis et al. | 361/24 |
| 4,363,065 | 12/1982 | Hasegawa et al. | 361/85 |
| 4,434,390 | 2/1984 | Elms | 361/24 |
| 4,514,989 | 5/1985 | Mount | 62/201 |
| 4,544,982 | 10/1985 | Boothman et al. | 361/31 |
| 4,557,114 | 12/1985 | Kato et al. | 62/126 |
| 4,722,059 | 1/1988 | Engel et al. | 364/483 |
| 4,751,653 | 6/1988 | Junk et al. | 364/481 |
| 4,802,053 | 1/1989 | Wojtak et al. | 361/86 |
| 4,827,369 | 5/1989 | Saletta et al. | 364/483 |
| 4,935,685 | 6/1990 | Justus et al. | 361/24 |
| 4,996,646 | 2/1991 | Farrington | 364/492 |

Primary Examiner—Kevin J. Teska
Attorney, Agent, or Firm—William J. Beres; William O'Driscoll

[57] ABSTRACT

A method of protecting the compressor motor of a refrigeration system using a multiphase AC power source. The method comprises the steps of monitoring each phase of the power supply to the compressor motor; calculating the average phase for the phases of the AC power supply; determining a maximum phase unbalance deviation from the average phase; determining if a first level of phase unbalance protection is active; setting a system protection level as the first level of phase unbalance protection if the first level is active; setting the system protection level as a second higher level of phase unbalance protection if the first level is not active; and initiating a compressor motor shutdown if the system protection level is exceeded by the maximum unbalanced phase deviation.

17 Claims, 2 Drawing Sheets

MULTILEVEL PHASE UNBALANCE COMPRESSOR MOTOR PROTECTION SYSTEM

DESCRIPTION

1. Technical Information

The present invention is directed to a refrigeration compressor motor protection system, and more particularly, to a protection system which provides multiple levels of phase unbalance protection, one of which is user defeatable.

2. Background of the Invention

Previous compressor motor phase unbalance protection systems operate by shutting down the compressor in a refrigeration system if a first predetermined level of phase unbalance in the AC power supply to the compressor is exceeded. Often, however, the refrigeration system is necessary to cool delicate equipment such as computer systems. In such cases, the user of the refrigeration system is willing to bypass the automatic compressor motor safeguards and to risk damage to the refrigeration system compressor in order to protect the delicate equipment. However, there are inherent dangers in operating a compressor motor without safeguards.

SUMMARY OF THE INVENTION

It is an object of the present invention to resolve the problems of the prior art refrigeration compressor motor protection systems.

It is a feature of the present invention to provide a first level of compressor motor phase unbalanced protection which is defeatable by the user.

It is a feature of the present invention to provide a second higher level of compressor motor phase unbalance protection which is not defeatable by the user.

It is an advantage of the present invention that critical compressor components are protected.

It is also an advantage of the present invention that some compressor safeguards are always active.

The present invention provides a method of protecting the compressor motor of a refrigeration system using a multiphase AC power source. The method comprises the steps of monitoring each phase of the power supply to the compressor motor; calculating an average phase for the phases of the AC power supply; determining a maximum phase unbalance deviation from the average phase; determining if a first level of phase unbalance protection is active; setting a system protection level as the first level of phase unbalance protection if the first level is active; setting the system protection level as a second higher level of phase unbalance protection if the first level is not active; and initiating a compressor motor shutdown if the system protection level is exceeded by the maximum unbalanced phase deviation.

The present invention provides apparatus for protecting the compressor motor of a refrigeration system using a multiphase AC power source. The apparatus comprises a compressor motor; a multiphase AC power supply; means for monitoring each phase of the power supply to the compressor motor; means for calculating an average phase for the phases of the AC power supply; means for determining a maximum phase unbalance deviation from the average phase; means for determining if a first level of phase unbalance protection is active; means for setting a system protection level as the first level of phase unbalance protection if the first level is active; means for setting the system protection level as a second higher level of phase unbalance protection if the first level is not active; and means for initiating a compressor motor shutdown if the system protection level is exceeded by the maximum unbalanced phase deviation.

The present invention provides a method of protecting the compressor motor of a refrigeration system using a multiphase AC power source. The method comprises the steps of monitoring each phase current of the power supply to the compressor motor; calculating an average phase current for the phases of the AC power supply; determining a maximum deviation from the average phase current; determining if a first level of phase unbalance protection is active; setting a system protection level as the first level of phase unbalance protection if the first level is active; setting the system protection level as a second higher level of phase unbalance protection if the first level is not active; and initiating a compressor motor shutdown if the system protection level is exceeded by the maximum deviation.

The present invention provides apparatus for protecting a motor of a refrigeration system using a multiphase AC power source comprising: a motor; a multiphase AC power supply; means for monitoring each phase of the power supply to the motor; means for calculating an average phase for the phases of the AC power supply; means for determining a maximum phase unbalance deviation from the average phase; means for determining if a first level of phase unbalance protection is active; means for setting a system protection level as the first level of phase unbalance protection if the first level is active; means for setting the system protection level as a second higher level of phase unbalance protection if the first level is not active; and means for initiating a motor shutdown if the system protection level is exceeded by the maximum unbalanced phase deviation.

The present invention provides a method of protecting a motor of a refrigeration system using a multiphase AC power source comprising the steps of: monitoring each phase of the power supply to the motor; calculating an average phase for the phases of the AC power supply; determining a maximum phase unbalance deviation from the average phase; determining if a first level of phase unbalance protection is active; setting a system protection level as the first level of phase unbalance protection if the first level is active; setting the system protection level as a second higher level of phase unbalance protection if the first level is not active; and initiating a motor shutdown if the system protection level is exceeded by the maximum unbalanced phase deviation.

DETAILED DESCRIPTION

Figure 1:
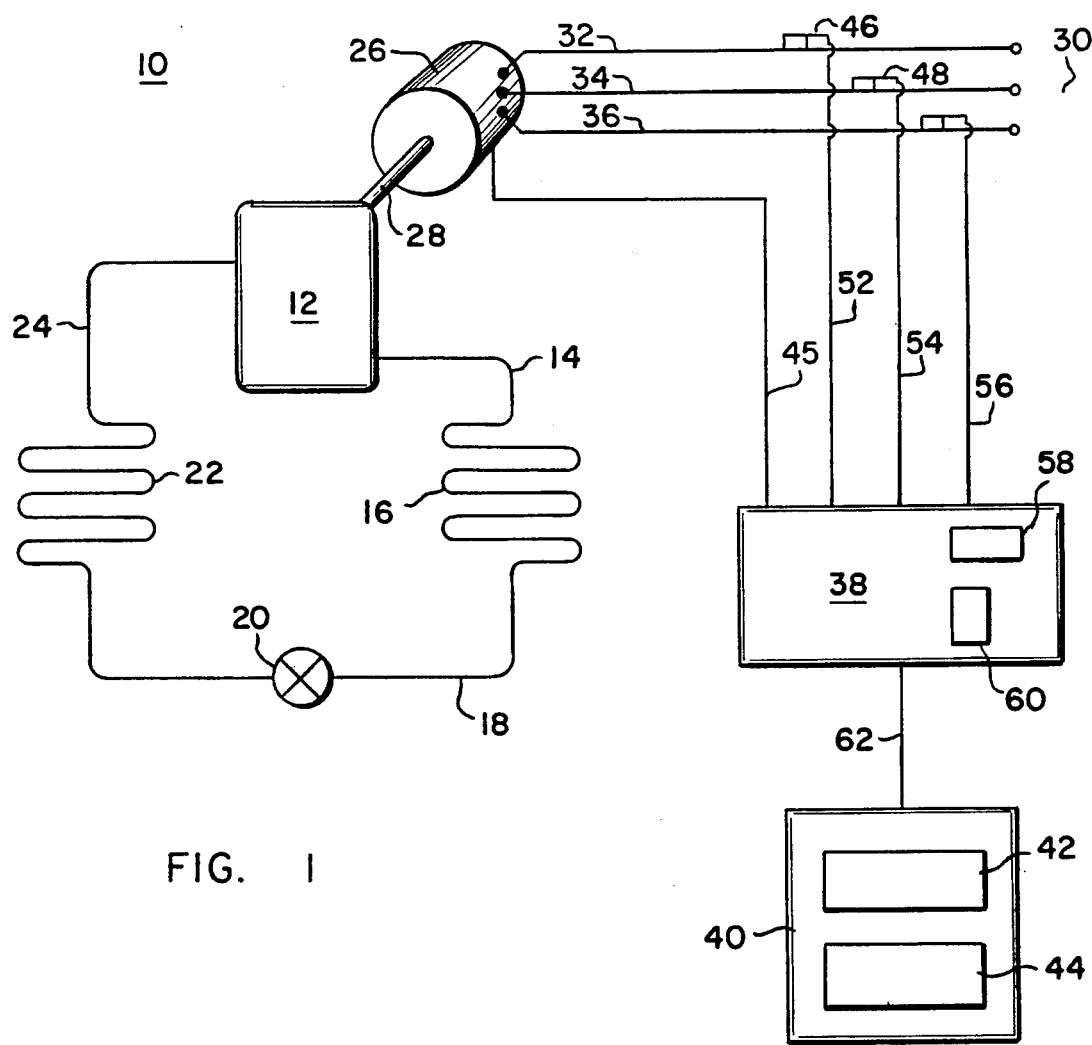
FIG. 1 is a block diagram of a refrigeration system of the kind to which the method of the present invention is applicable.

As is shown in FIG. 1, a refrigeration system 10 will generally include a compressor 12 for compressing vaporized refrigerant, and a hot gas line 14 for conducting the compressed refrigerant vapor to a condenser 16. In the condenser 16 the compressed refrigerant vapor is condensed into a liquid by heat exchange with a cooling medium. The liquid refrigerant is conducted from the condenser 16 by a refrigerant line 18 through an expansion valve 20 to an evaporator 22 where the refrigerant vaporizes in the process of heat exchange with a medium to be cooled. The expansion valve 20 maintains the high side pressure created by the compressor 12 and controls the flow of refrigerant to the evaporator 22. A suction line 24 conducts the vaporized refrigerant from the evaporator 22 back to the compressor 12.

Typically the compressor 12, whether a reciprocating, scroll, centrifugal or screw compressor, is connected to a motor 26 by an extension 28 of the motor shaft. The motor 26 is shown as an induction motor powered by a suitable three phase source of AC power 30. Three wires 32, 34 and 36 connect the motor 26 to each phase of the three phase AC power source 30. It should be noted that the invention is not intended to be limited to three phase induction motors, but with appropriate modifications contemplates various numbers of current phases and other refrigeration system motors such as condenser fan motors and air handling unit motors.

A motor compressor protection module 38 is provided to monitor the operation of and protect the compressor 12. The motor compressor protection module 38 is controlled by a higher level controller 40 connected to the motor compressor protection module 38 by a serial communications link 62. The high level controller 40 includes a display 42 and a keypad 44 which allow a user to set or alter protection parameters. The altered parameters are transmitted over the serial communications link 62 to the motor compressor protection module 38. The motor compressor protection module 38 is connected to the motor 26 by a connecting line 45 which allows the motor compressor protection module 38 to turn the compressor motor 26 on or off. The motor compressor protection module 38 typically include a number of functions, including overcurrent and phase unbalance protection. Since phase unbalance protection is the subject of the present invention, the other functions will be discussed only to the extent necessary to provide an understanding of the present invention.

Each phase current wire 32, 34 and 36 is monitored by a current transformer 46, 48 and 50 connected to the motor compressor protection module 38 by transformer wires 52, 54 and 56. The current transformers 46, 48 and 50 provide the motor compressor protection module 38 with an indication of the amount of current carried by each wire 32, 34 and 36 at any particular time.

The present invention resides in the operation of a compressor phase unbalance protection system 100 which protects the compressor motor 26, and is described as follows.

Figure 2:
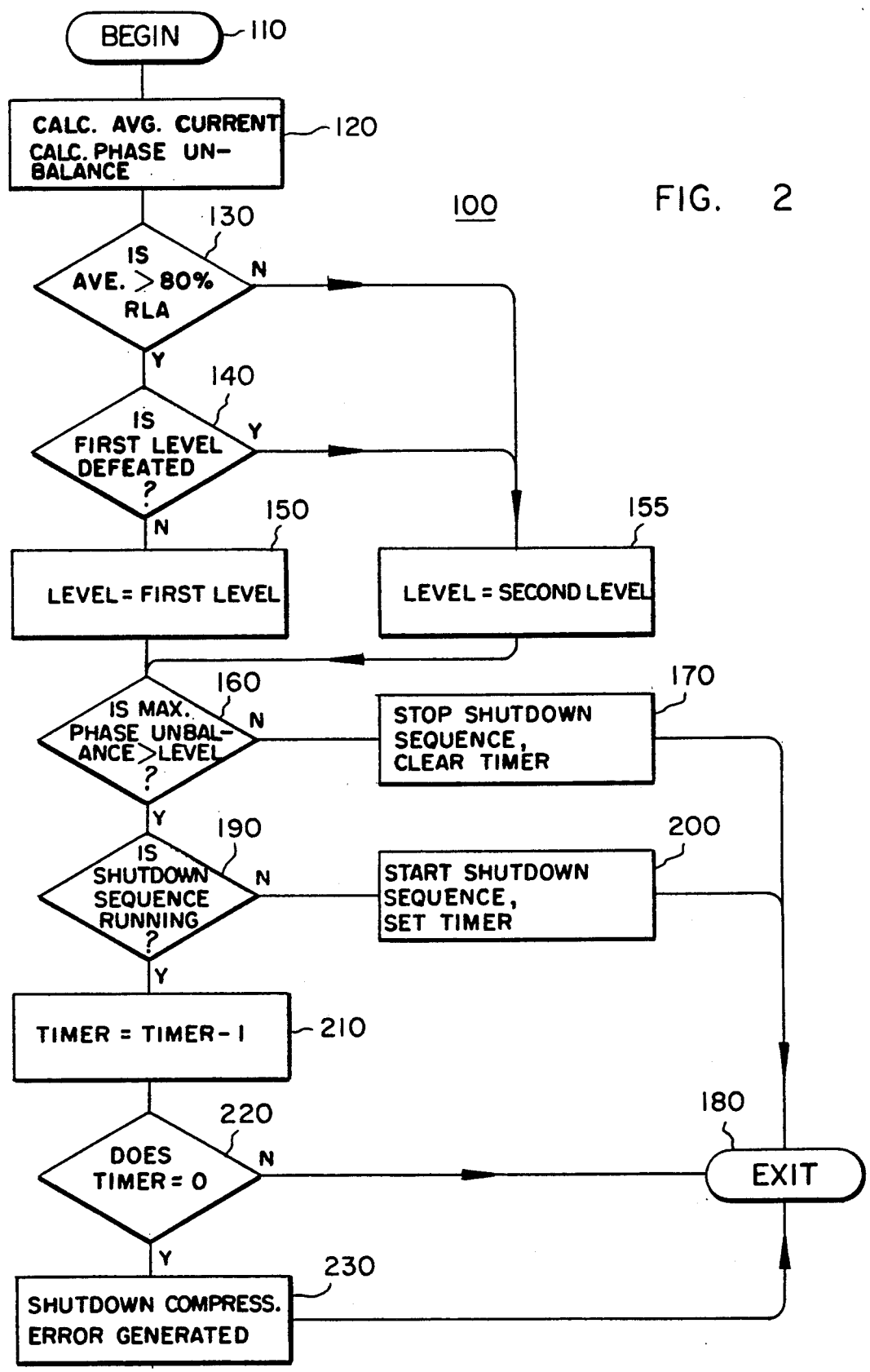
FIG. 2 is an operational flow chart of the method of the present invention.

In the preferred embodiment shown in FIG. 2, the phase unbalance protection system 100 is controlled by a NEC 7800 series microprocessor included in the motor compressor protection module 38. Other suitable controllers are contemplated, whether or not microprocessors.

The first step 120 of the phase unbalance protection system 100 is entered every 400 milliseconds from a clock driven interrupt routine provided by the operating system of the NEC microprocessor. The timing of the interrupt period and the form of the interrupt are not critical. For example, a different interrupt period or a flag driven interrupt are acceptable with appropriate modification to the motor compressor protection module 38. However, the phase unbalance protection system 100 must be entered regularly to prevent damage from a phase unbalance.

At step 120, the average phase current is determined by summing the currents measured by each of the current transformers 46, 48 and 50 and dividing the sum by the number of current transformers 46, 48 and 50. Next, the maximum phase unbalance is determined by comparing the phase current measured by each of current transformers 46, 48 and 50 with the average phase current and selecting the phase current which deviates most from the average phase current. Maximum phase unbalance is expressed as a percentage by taking the difference between the most deviant phase current and the average phase current, dividing by the average phase current and multiplying by 100. This method of determining phase unbalance is approved by NEMA. However, there exist other ways of determining phase unbalance, including those which monitor actual current and voltage phase angles. All such variations are contemplated by the present invention.

At the next step 130, the average phase current is compared to 80% of the compressor motor's rated load amperage. If the average phase current does not exceed 80% of the rated load average, a first level of phase unbalance protection is bypassed because the inherent errors in determining the average phase current below 80% of the rated load average are likely to exceed the first level of phase unbalance protection. This first level of protection is typically selected as a percentage of deviation from the average phase current which will indicate damage to the compressor motor. A deviation from the average phase current of approximately 15% has been determined to provide adequate protection in the preferred embodiment of the present invention.

Similarly, the first level of phase unbalance protection will be bypassed at step 140 if a user has entered an access code into the high level controller 40 and defeated the first level of protection.

At the next step 150, the protection level for the phase imbalance protection system 100 is established. The first level of protection is selected if the first level has not previously been bypassed in steps 130 or 140. Otherwise, at step 155, a second phase unbalance protection level is set and used as the system protection level. This second level is selected as a percentage of deviation from the average phase current which will indicate damage to critical components in the motor compressor protection module 38. A deviation from the average phase current of approximately 30% has been determined to provide adequate protection in the preferred embodiment. Both the first and second levels of protection are predetermined by the designer of the particular refrigeration system in which the phase unbalance protection system 100 is to be used, and are not capable of being altered by the user.

Once the system protection level has been established at step 150, the maximum phase unbalance percentage calculated at step 120 is compared with the system protection level at step 160. If the protection level is not exceeded, step 170 is initiated. At step 170 any compressor shutdown sequences which are in progress are stopped, and related timers and flags are cleared. The protection system 100 is then exited at step 180.

However, if the percentage of maximum phase unbalance percentage exceeds the system protection level, the compressor shutdown sequence beginning at step 190 is commenced.

At step 190, the protection system determines if the shutdown sequence has already been initiated by checking a flag set at step 200 when the compressor shutdown sequence is started. If the sequence has not been initiated, the sequence is initiated at step 200 by setting a count down timer to an initial count down delay value and indicating this by setting a flag to show that the compressor shutdown sequence is now running. After the shutdown sequence is started, the protection system 100 is exited at step 180.

The initial count down delay value is preselected by the system designer from a time delay range of 5 to 30 seconds to prevent a temporary phase unbalance from initiating a compressor shutdown. A time delay of approximately 15 seconds has been determined to be sufficient in the preferred embodiment. Because the protection routine 100 is entered at a time interval which is less than one second, the desired time delay is divided by the interrupt time period to determine the number of actual interrupts to delay before shutting down the compressor system. For example, the countdown timer is set at 38 interrupts if a 15 second delay was desired using a 400 millisecond interrupt. If the particular controller selected for use includes user available timing routines such routines can be used. For instance, if the controller periodically decrements the value in a certain location, the present invention can be modified to store a value equivalent to 15 seconds in that location whenever a normal phase balance is detected. If an abnormal phase balance is detected, the time delay is not continually reset. The system is then allowed to decrement the value to zero, whereupon the compressor motor 26 is shut down by an off signal transmitted on line 45.

If at step 190 the shutdown sequence was determined to already be in progress, the countdown timer is decremented at step 210. At step 220 the countdown timer is compared to zero and the protection system 100 exited if the time delay has not yet expired. If the count down timer has reached zero, the phase unbalance has existed for at least 15 seconds in the preferred embodiment. Consequently, at step 230, the compressor 12 is shutdown, and a diagnostic error code generated for display on the display 42 indicating that a manual restart of the compressor 12 is required.

The foregoing phase protection system allows the user to protect delicate equipment by ensuring that the compressor continues to operate even though a phase unbalance indicating potential compressor motor damage has been detected. The invention ensures that the compressor cannot continue to operate if a phase unbalance indicating critical component failure in the motor compressor protection module 38 has been detected. The invention ensures this by providing a second level of protection which is not defeatable by a user.

Although the preferred embodiment has described above, it is apparent that many alterations and modifications can be made without departing from the subject invention. It is intended that all such alterations and modifications be considered within the scope and spirit of the invention as defined in the following claims.

What is claimed and desired to be secured by Letters Patent of the United States is:

1. A method of protecting a compressor motor of a refrigeration system using a multiphase AC power supply comprising the steps of:
   monitoring each current or voltage phase of the power supply to the compressor motor;
   calculating an average phase for the current or voltage phases of the AC power supply;
   determining a maximum phase unbalance deviation from the average phase;
   determining if a first level of phase unbalance protection is active;
   setting a system protection level as the first level of phase unbalance protection if the first level is active;
   setting the system protection level as a second higher level of phase unbalance protection if the first level is not active; and
   initiating a compressor motor shutdown if the system protection level is exceeded by the maximum unbalance phase deviation.

2. The method of claim 1 including the step of setting the first level of phase unbalance protection to be a first value which prevents potential damage to the compressor motor.

3. The system of claim 2 including the step of setting the second level of phase unbalance protection to be a second value which prevents potential damage to critical components in a compressor motor safety protection system.

4. The system of claim 3 including the step of setting the first value to represent a deviation of approximately 15% from the average phase.

5. The method of claim 4 including the step of setting the second value to represent a deviation of approximately 30% from the average phase.

6. The method of claim 5 wherein the step of calculating average phase includes the step of determining a third value for each phase of current at a given time.

7. The method of claim 1 wherein the step of calculating average phase includes the step of determining a value for each of current at a given time.

8. The method of claim 7 wherein the step of determining maximum phase unbalance deviation further includes the steps of comparing the value for each phase of current to the average phase, and selecting as the maximum phase unbalance deviation whichever of the values differs the most from the average phase.

9. The method of claim 1 including the further step of delaying the compressor motor shutdown for a predetermined amount of time.

10. The method of claim 9 wherein the time delay is in the range of 5 to 30 seconds.

11. The method of claim 9 wherein the time delay is 15 seconds.

12. The method of claim 1 wherein the compressor motor has a rated load amperage and including the further step of bypassing the first level of protection if the average phase is less than 80% of the compressor motor's rated load amperage.

13. The method of claim 1 wherein the step of calculating average phase includes the step of determining a voltage value for each phase at a given time.

14. Apparatus for protecting a compressor motor of a refrigeration system using a multiphase AC power source comprising:
   a compressor motor;
   a multiphase AC power supply;
   means for monitoring each current or voltage phase of the power supply to the compressor motor;
   means for calculating an average phase for the current or voltage phases of the AC power supply;
   means for determining a maximum phase unbalance deviation from the average phase;

means for determining if a first level of phase unbalance protection is active;

means for setting a system protection level as the first level of phase unbalance protection if the first level is active;

means for setting the system protection level as a second higher level of phase unbalance protection if the first level is not active; and means for initiating a compressor motor shutdown if the system protection level is exceeded by the maximum unbalance phase deviation.

15. A method of protecting a compressor motor of a refrigeration system using a multiphase AC power supply comprising the steps of:

monitoring each phase current of the power supply to the compressor motor;

calculating an average phase current for the phases of the AC power supply;

determining a maximum deviation from the average phase current;

determining if a first level of phase unbalance protection is active;

setting a system protection level as the first level of phase unbalance protection if the first level is active;

setting the system protection level as a second higher level of phase unbalance protection if the first level is not active; and initiating a compressor motor shutdown if the system protection level is exceeded by the maximum deviation.

16. Apparatus for protecting a motor of a refrigeration system using a multiphase AC power supply comprising:

a motor;

a multiphase AC power supply;

means for monitoring each current or voltage phase of the power supply to the motor;

means for calculating an average phase for the current or voltage phases of the AC power supply;

means for determining a maximum phase unbalance deviation from the average phase;

means for determining if a first level of phase unbalance protection is active;

means for setting a system protection level as the first level of phase unbalance protection if the first level is active;

means for setting the system protection level as a second higher level of phase unbalance protection if the first level is not active; and means for initiating a motor shutdown if the system protection level is exceeded by the maximum unbalance phase deviation.

17. A method of protecting a motor of a refrigeration system using a multiphase AC power supply comprising the steps of:

monitoring each current or voltage phase of the power supply to the motor;

calculating an average phase for the current or voltage phases of the AC power supply;

determining a maximum phase unbalance deviation from the average phase;

determining if a first level of phase unbalance protection is active;

setting a system protection level as the first level of phase unbalance protection if the first level is active;

setting the system protection level as a second higher level of phase unbalance protection if the first level is not active; and initiating a motor shutdown if the system protection level is exceeded by the maximum unbalance phase deviation.

* * * * *